United States Patent
Du et al.

(10) Patent No.: US 12,446,026 B2
(45) Date of Patent: Oct. 14, 2025

(54) SIDELINK TRANSMISSION METHOD BASED ON CONFIGURED GRANT CONFIGURATION, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhongda Du, Guangdong (CN); Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 421 days.

(21) Appl. No.: 18/148,668

(22) Filed: Dec. 30, 2022

(65) Prior Publication Data
US 2023/0224893 A1 Jul. 13, 2023

Related U.S. Application Data

(63) Continuation of application No. PCT/CN2020/129467, filed on Nov. 17, 2020.

(51) Int. Cl.
*H04W 72/1263* (2023.01)
*H04W 72/40* (2023.01)

(52) U.S. Cl.
CPC ....... *H04W 72/1263* (2013.01); *H04W 72/40* (2023.01)

(58) Field of Classification Search
CPC . H04W 72/1263; H04W 72/40; H04W 72/25; H04W 72/23; H04W 28/0284; H04W 4/40; H04W 72/1289; H04W 72/14; H04W 72/232; H04W 72/535; H04W 72/542; H04W 28/0289; H04W 72/569; H04W 92/18; H04L 1/1812; H04L 1/1822; H04L 1/1887; H04L 1/1893; H04L 2001/0092; H04L 47/32
See application file for complete search history.

(56) References Cited

U.S. PATENT DOCUMENTS

| | | | |
|---|---|---|---|
| 2020/0045674 A1 | 2/2020 | Tseng et al. | |
| 2020/0178292 A1* | 6/2020 | Kim | H04W 72/23 |
| 2020/0178293 A1 | 6/2020 | Jeons et al. | |

(Continued)

FOREIGN PATENT DOCUMENTS

| | | |
|---|---|---|
| CN | 110035543 | 7/2019 |
| CN | 110798888 | 2/2020 |

(Continued)

OTHER PUBLICATIONS

WIPO, International Search Report and Written Opinion for PCT/CN2020/129467, Sep. 1, 2021.

(Continued)

*Primary Examiner* — Rushil P. Sampat
(74) *Attorney, Agent, or Firm* — Hodgson Russ LLP

(57) ABSTRACT

A wireless communication method and a terminal device are provided. The method is applied to a terminal device and includes: acquiring Configured Grant (CG) configuration information; and performing a sidelink (SL) transmission based on the CG configuration information. The CG configuration information includes information of a plurality of CG resource sets in a CG resource period.

20 Claims, 5 Drawing Sheets

(56) References Cited

U.S. PATENT DOCUMENTS

2020/0322939 A1* 10/2020 Cao ................. H04W 72/02
2021/0153176 A1*  5/2021 Lee ................. H04W 4/40
2022/0408457 A1* 12/2022 Ko ................. H04L 1/1822

FOREIGN PATENT DOCUMENTS

| CN | 111278050 | 6/2020 |
| CN | 111432480 | 7/2020 |
| CN | 111867075 | 10/2020 |
| WO | WO 2021/086051 A1 * | 5/2021 |

OTHER PUBLICATIONS

OPPO, "Remaining issues of mode 1 resource allocation for NR-V2X," 3GPP TSG RAN WG1 #100, R1-2000490, Feb. 2020.
LG Electronics, "Discussion on NR sidelink resource allocation for Mode 1," 3GPP TSG RAN WG1 #99 Meeting, R1-1912587, Nov. 2019.
OPPO, "Left issues on MAC running CR," 3GPP TSG-RAN2 Meeting # 109bis electronic, R2-2002648, Apr. 2020.
EPO, Extended European Search Report for EP Application No. 20961835.4, Dec. 4, 2023.

* cited by examiner

SIDELINK TRANSMISSION METHOD BASED ON CONFIGURED GRANT CONFIGURATION, TERMINAL DEVICE, AND NETWORK DEVICE

CROSS-REFERENCE TO RELATED APPLICATIONS

This application is a continuation of International Application No. PCT/CN2020/129467, filed Nov. 17, 2020, the entire disclosure of which is incorporated by reference herein.

TECHNICAL FIELD

The present disclosure relates to a field of communications, and in particular to a wireless communication method and a terminal device.

BACKGROUND

A communication architecture such as Device to Device (D2D), Vehicle to Vehicle (V2V), Vehicle to Everything (V2X) may be configured to achieve communication between terminals based on Sidelink (SL) technology, which is different from a traditional cellular system where communication data is received or sent through a network device. A direct communication manner between terminals has a greater spectral efficiency and a lower transmission delay.

When a SL operates in an unlicensed spectrum, a case of failing to send data may exist due to Listen before talk (LBT). When a retransmission resource of a sender terminal is dynamically scheduled by the network device, an additional delay may be introduced or the retransmission resource may not be acquired in time. In particular, in a case of a Uu interface also operating in the unlicensed spectrum, a severer additional delay may be introduced or difficulty of the retransmission resource being acquired in time may be improved.

SUMMARY OF THE DISCLOSURE

A wireless communication method and a terminal device are provided in some embodiments of the present disclosure.

According to a first aspect of the present disclosure, a wireless communication method is provided and includes acquiring Configured Grant (CG) configuration information; and performing a sidelink (SL) transmission based on the CG configuration information; wherein the CG configuration information comprises information of a plurality of CG resource sets in a CG resource period.

According to a second aspect of the present disclosure, a wireless communication method is provided and includes a network device sending CG configuration information to a terminal device; wherein the CG configuration information comprises information of a plurality of CG resource sets in a CG resource period.

According to a third aspect of the present disclosure, a terminal device is provided and includes a processor; and a memory, configured to store a computer program; wherein the processor is configured to call and run the computer program stored in the memory, so as to implement the above method.

DETAILED DESCRIPTION

Technical solutions in the embodiments of the present disclosure will be described in the following with reference to accompanying drawings in the embodiments of the present disclosure. Obviously, described embodiments are not all of the embodiments of the present disclosure but a part of them. For the embodiments of the present disclosure, all other embodiments obtained by a person of ordinary skill in the art without creative effort fall into a scope of the present disclosure.

Before introducing the technical solutions of the present disclosure, some concepts related to the present disclosure are described in the following.

1. D2D/V2X

D2D communication is a SL transmission technology based on D2D, which is different from the traditional cellular system where the communication data is received or sent through the network device, and thus has the greater spectral efficiency and lower transmission delay. A telematics system adopts a D2D direct communication manner. The 3rd Generation Partnership Project (3GPP) defines two transmission modes, i.e., a first mode and a second mode.

Figure 1:
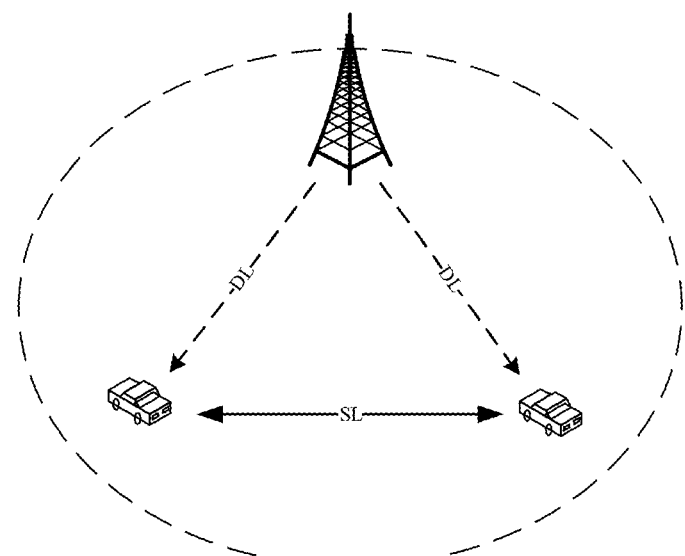
FIG. 1 is a schematic view of a first mode according to some embodiments of the present disclosure.

The first mode: As shown in FIG. 1, a transmission resource of a terminal is allocated by the network device, and the terminal sends data on the SL based on the resource allocated by the network device.

Figure 2:
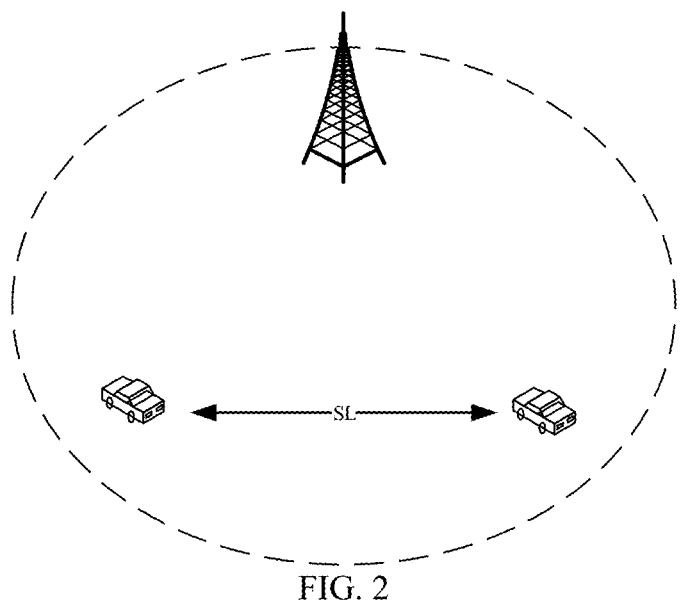
FIG. 2 is a schematic view of a second mode according to some embodiments of the present disclosure.

The second mode: As shown in FIG. 2, the terminal selects a resource in a resource pool for data transmission.

2. Side Feedback

In New Radio (NR)-V2X, a side feedback channel is introduced to improve reliability. For example, for a unicast transmission, the sender terminal sends side data including data on a Physical Sidelink Control Channel (PSCCH) and a Physical Sidelink Shared Channel (PSSCH) to a receiver terminal. The receiver terminal sends side feedback information to the sender terminal, and the sender terminal determines whether retransmission is required based on the feedback information from the receiver terminal. The side feedback information is also referred to as Hybrid Automatic Repeat Qequest (HARQ) feedback information. This side feedback information is carried in a side feedback channel, such as a Physical Sidelink Feedback Channel (PSFCH).

The sender terminal may dynamically activate or de-activate the side feedback through Sidelink Control Information (SCI). When the side feedback is activated, the receiver terminal receives the side data sent from the sender terminal and feeds back an Acknowledgement (ACK) or a Negative Answer (NK) to a sender end based on a detection result. The sender terminal decides to send retransmitted data or new data based on the feedback information from a receiver end. When the side feedback is de-activated, the receiver terminal is not required to send the feedback information, and the sender terminal usually sends the data in a blind retransmission manner. For example, the sender terminal sends each side data repeatedly K times, instead of deciding whether the retransmission data is required to be sent based on the side feedback information. When a side transmission resource is scheduled by the network equipment, i.e., the first mode mentioned above, the sender terminal is required to report the side feedback information to the network device, and the network device decides whether to allocate the retransmission resource to the terminal based on the ACK or NACK reported by the terminal.

3. LBT Mechanism

A general energy detection mechanism is the LBT mechanism, and a basic principle of the LBT mechanism is: the network device or the sender terminal is required to listen for a period of time according to regulations before transmitting data on the unlicensed spectrum. When a listening result indicates that the channel is in an idle state, the sender terminal may transmit the data to the receiver terminal. When the listening result indicates that the channel is an occupied state, the sender terminal is required to back off for a period of time to continue listening to the channel according to the regulations and transmit the data to the receiver terminal until the listening result indicates that the channel is in the idle state.

4. SL Time Slot and Resource-Pool Time Slot

When a carrier on the SL and an uplink carrier (i.e., a carrier between the terminal device and the network device) are shared, the uplink time slot (i.e., the time slot configured for an uplink transmission) and a side time slot (i.e., the time slot configured for a side transmission) are separated in the time domain with the time slot as a granularity. It means that within a wireless frame (10 ms), some time slots are configured for the uplink transmission, while some time slots are configured for the side transmission. When a carrier on the SL is an independent carrier, all time slots are side time slots, in which case sequential numbers of the side time slots are repeatedly numbered from 0 according to the System Frame Number (SFN) period.

The side time slots include side time slots directly configured to send the data (i.e., side data time slots) and other side time slots. The other side time slots include the time slots configured to send a synchronous reference signal and a Master Information Block (MIB) (i.e., Synchronous Signal (SS)/PBCH Block (SSB) time slots) and some reserved time slots. Resource-pool time slots are a part of the above side data time slots, and each resource-pool time slot is indicated by a bitmap having a fixed length.

Figure 3:
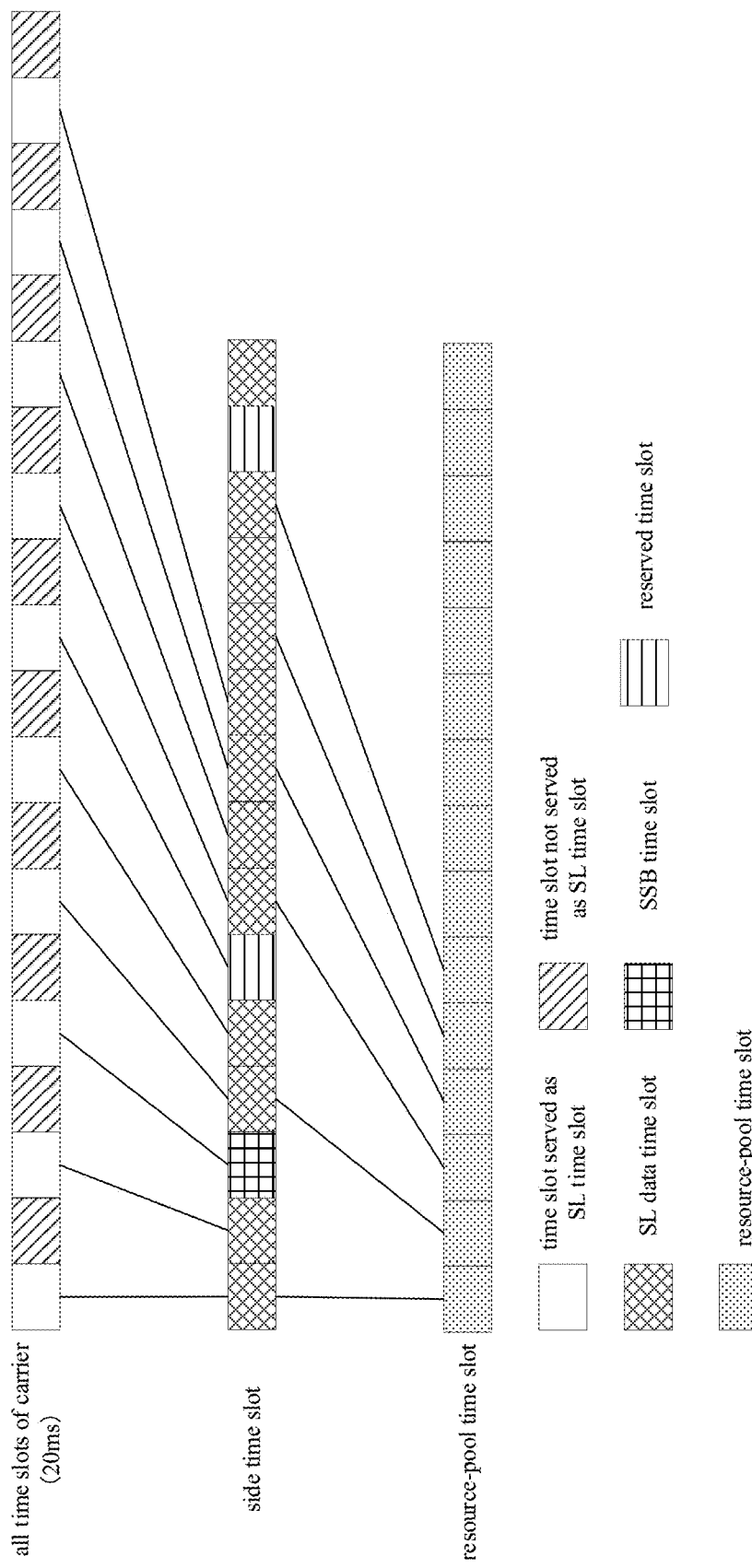
FIG. 3 is a schematic view of a time slot distribution according to some embodiments of the present disclosure.

FIG. 3 is a schematic view of a time slot distribution according to some embodiments of the present disclosure. As shown in FIG. 3, some of time slots of a carrier shown in the first row are configured to be SL time slots, such as the SL time slots shown in the second row. The SL time slots include the side data time slots, SSB time slots, and the reserved time slots. A total number of the side time slots in each two radio frames, i.e., 20 ms, is L. The parameter L is configured by the network device. A part of the SL data time slots forms a resource pool, which are referred to as the resource-pool time slots. The resource pool associated with the configured CG resource is required to be specified when the network device configures a CG (Configured Grant) resource. Therefore, the above resource-pool time slots are the time slots of the resource pool associated with this CG resource. FIG. 3 shows characteristics of wireless resources in the time domain. Actually, in a frequency domain, these wireless resources may be in different resource locations. For example, these wireless resources may be in the same LBT detection channel or in different LBT detection channels. A bandwidth of the LBT detection channel is generally defined as 20 MHz, but is not limited thereto.

As described above, when the SL operates in the unlicensed spectrum, the case of failing to send the data may exist due to the LBT. When the retransmission resource of the sender terminal is dynamically scheduled by the network device, i.e., the first mode mentioned above is adopted, the additional delay may be introduced or the retransmission resource may not be acquired in time. Especially when the Uu interface also operates in the unlicensed spectrum, the severer additional delay may be introduced or the difficulty of the retransmission resource being acquired in time may be improved.

In order to resolve the above technical problems, in the present disclosure, the CG resource is adopted to perform a SL transmission on the SL in the first mode mentioned above.

It should be understood that in the present disclosure, the CG is also referred to as scheduling-free grant, which is not limited in the present disclosure.

It should be understood that the terminal device may also be referred to as a User Equipment (UE), an access terminal, a user unit, a user station, a mobile station, a mobile platform, a remote station, a remote terminal, a mobile device, a user terminal, a terminal, a wireless communication device, a user agent, or a user device, etc. The terminal device may be a STAION (ST) in the WLAN, a cellular phone, a cordless phone, a Session Initiation Protocol (SIP) phone, a Wireless Local Loop (WLL) station, a Personal Digital Assistant (PDA) device, a handheld device having wireless communication functions, a computing device, or other processing devices connected to a wireless modem, an in-vehicle device, a wearable device, and a next-generation communication system, for example, the terminal device in a NR network or the terminal device in an evolving-in-future Public Land Mobile Network (PLMN).

For an example but not a limitation, in the embodiments of the present disclosure, the terminal device may also be the wearable device. The wearable device may also be referred to as a wearable smart device, which is a general term for the wearable device developed through performing an intelligent design for a daily wear by adopting a wearable technology, such as glasses, gloves, watches, clothing, and shoes. The wearable device is a portable device which is worn directly on a body or integrated into the clothing or accessories of the user. The wearable device is not only a hardware device, but also implement powerful functions through a software support, a data interaction, and a cloud interaction. The wearable smart device in a broad sense may include devices which have complete functions and a large size, and may implement full or a part of the functions without relying on a smart phone, such as smart watches or smart glasses; and devices which may only focus on a certain type of application function and are required to be used cooperating with other devices such as smart phones, for example, all kinds of smart bracelets, smart jewelry, etc. for physical body-sign monitoring.

In the embodiments of the present disclosure, the network device may be a device configured to communicate with the mobile device. The network device may be an AP (Access Point) and the GSM in the WLAN, or a BTS (Base Transceiver Station) in CDMA, or a NodeB (NB) in the WCDMA, or an eNB or eNodeB (Evolutional Node B) in LTE, or a relay station, or AP, or the in-vehicle device, the wearable device, and a gNB in the NR network, or the network device in the evolving-in-future PLMN, and the like.

It should be understood that the embodiments of the present disclosure are applicable not only to the communication architecture such as D2D, V2V, V2X, etc., but also to any other D2D communication architectures, which is limited in the present disclosure. The embodiments of the present disclosure are applied to the unlicensed spectrum which is also referred to as the license-free spectrum. For example, the embodiments of the present disclosure are applied to the unlicensed spectrum such as 2.4 GHz, 5 GHz, 6 GHz, or 60 GHz.

In descriptions of the embodiments of the present disclosure, the term "correspond" or variants thereof may indicate a direct correspondence relationship or an indirect correspondence relationship between two components, or may indicate an association relationship between the two components, or a relationship of indicating and being indicated, configuring and being configured, etc.

The technical solutions of the present disclosure are described in detail in the following.

It should be noted that, for convenience of describing the technical solutions, terminal devices are divided to the sender terminal and the receiver terminal, and the terminal device in the claims may be understood to be the sender terminal herein, which is not repeated in subsequent descriptions.

Figure 4:
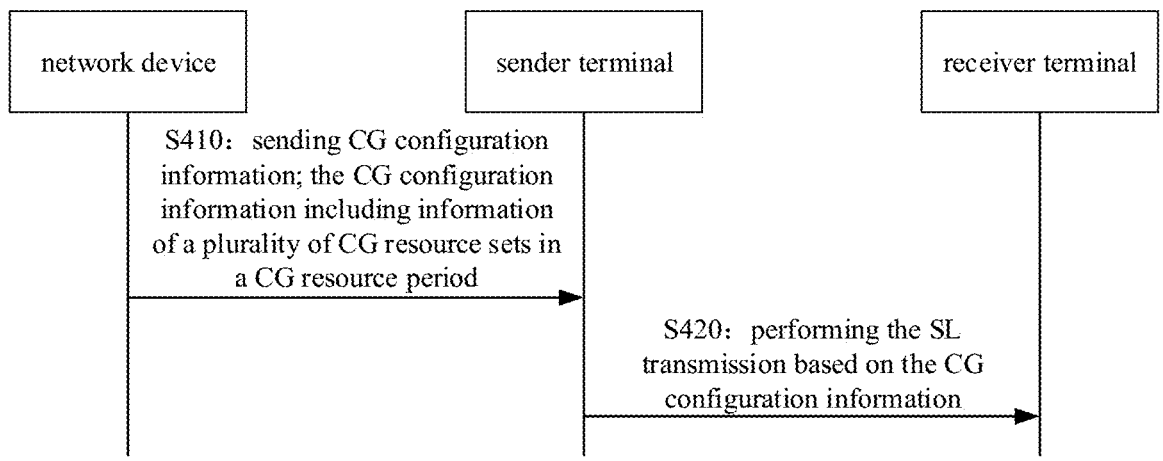
FIG. 4 is a flowchart of a wireless communication method according to some embodiments of the present disclosure.

FIG. 4 is a flowchart of a wireless communication method according to some embodiments of the present disclosure. As shown in FIG. 4, the method includes operations at blocks S410-S420.

At block S410, the method includes the network device sending CG configuration information to the sender terminal device, the CG configuration information including information of a plurality of CG resource sets in a CG resource period.

At block S420, the method includes the sender terminal device performing the SL transmission based on the CG configuration information.

It should be understood that in the present disclosure, the CG configuration information is also referred to as CG configuration. The CG configuration information or the CG configuration indicate configuration information or configuration about the CG resource.

Figure 5:
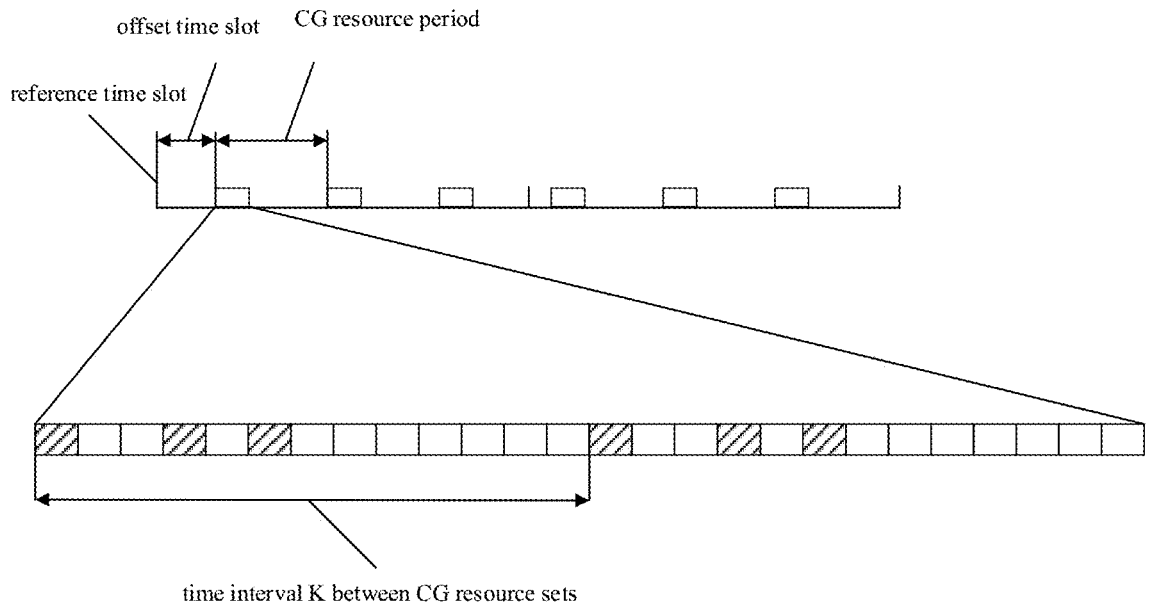
FIG. 5 is a schematic view of a distribution of CG (Configured Grant) resources according to some embodiments of the present disclosure.

It should be understood that CG resource period refers to a period in which the plurality of CG resource sets recurs. As shown in FIG. 5, the CG resource period refers to a period in which two CG resource sets recur.

In some embodiments, each CG resource in the plurality of CG resource sets mentioned above are configured to transmit the same data, including an initial transmission or the retransmission of the same data.

It should be understood that each CG resource set may include N CG resources, and N may take 1, 2 or 3, etc. The N CG resources are configured for the initial transmission or the retransmission of the same data. The parameter N may be configured by the network device, which is not limited thereto.

It should be understood that the CG resources in the plurality of CG resource sets are the same. For example, one CG resource period includes two CG resource sets, as shown in FIG. 5, and both of the two CG resource sets include a CG resource 1, a CG resource 2, and a CG resource 3.

In some embodiments, the retransmission of the data may be performed in the CG resource period in which the initial transmission of the data is made or may be performed in a CG resource period after the CG resource period in which the initial transmission of the data is made, which is not limited in the present disclosure.

In some embodiments, the information of the plurality of CG resource sets includes but is not limited to at least one of: the number M of the plurality of CG resource sets, and a time interval K between any two CG resource sets of the plurality of CG resource sets which are adjacent to each other in time domain.

In some embodiments, 1≤M≤M_MAX, M_MAX may be configured by the network device, which is not limited thereto.

In some embodiments, the CG configuration information further includes but is not limited to at least one of: the CG resource period, a reference time slot, an offset time slot, and time-frequency configuration information of each CG resource in the CG resource sets. The offset time slot is an offset time slot of the first CG resource configured by the CG configuration information relative to the reference time slot.

In some embodiments, a time slot involved in the CG configuration information mentioned above is the SL time slot or the resource-pool time slot. That is, the time slot involved in the CG configuration information is indicated according to an index of the SL time slot or an index of the resource-pool time slot.

It should be understood that the time slot involved in the CG configuration information includes but is not limited to at least one of: the CG resource period, the reference time slot, the offset time slot, time-frequency configuration information of each CG resource in the CG resource sets, and the time interval K between any two CG resource sets of the plurality of CG resource sets which are adjacent to each other in time domain.

In some embodiments, the reference time slot is 0 or $\lfloor P_1/2 \rfloor \times L \times (1/2)$, in response to the time slot involved in the CG configuration information being the SL time slot. $P_1$ indicates the number of wireless frames of a System Frame Number (SFN) period, L indicates the number of SL time slots of two wireless frames, and $\lfloor P_1/2 \rfloor \times L \times (1/2)$ indicates a middle time slot in the SFN period.

It should be understood that usually $P_1$=1024, such that the reference time slot is 0 or 256 L in response to the time slot involved in the CG configuration information being the SL time slot.

In some embodiments, the reference time slot is 0 or $\lfloor P_2/2 \rfloor$, in response to the time slot involved in the CG configuration information being the resource-pool time slot. $P_2$ indicates the number of resource-pool time slots in the SFN period, and $\lfloor P_2/2 \rfloor$ indicates a middle time slot in the resource-pool time slots.

It should be noted that a symbol $\lfloor \ \rfloor$ indicates rounding down, which is not repeated in the following descriptions.

It should be noted that the CG resources in the present disclosure may be type 1 CG resources or type 2 CG resources.

The type 1 CG resources indicate the CG resources configured entirely through a Radio Resource Control (RRC) signaling. For example, the CG resource period, the reference time slot, the offset time slot, the time-frequency configuration information of each CG resource in the CG resource sets, the number M of the plurality of CG resource sets, and the time interval K between any two CG resource sets of the plurality of CG resource sets which are adjacent to each other in time domain are all configured by the RRC signaling.

The type 2 CG resources indicate that specific time-frequency domain wireless resources are dynamically configured and activated through the Physical Downlink Control Channel (PDCCH) during each CG resource period. For example, the CG resource period, the reference time slot, the number M of the plurality of CG resource sets, and the time interval K between any two CG resource sets of the plurality of CG resource sets which are adjacent to each other in time domain are all configured by the RRC signaling, while the offset time slot and the time-frequency configuration information of each CG resource in the CG resource sets are configured and activated through the PDCCH signaling.

In some embodiments, the operation of the sender terminal performing SL transmission to the receiver terminal includes sending the data on the PSCCH and the PSSCH, the receiver terminal sending the side feedback information to the sender terminal, and the sender terminal determining whether the retransmission is required based on the feedback information from the receiver terminal. The side feedback information is carried in the side feedback channel, such as the PSFCH.

In some embodiments, the sender terminal may dynamically activate or de-activate the side feedback through the SCI. When the side feedback is activated, the receiver terminal receives the side data sent from the sender terminal and feeds back the ACK or the NK to the sender end based on the detection result. The sender terminal decides to send the retransmitted data or the new data based on the feedback information from the receiver end. When the side feedback is de-activated, the receiver terminal is not required to send the feedback information, and the sender terminal usually sends the data in the blind retransmission manner. For example, the sender terminal sends each side data repeatedly K times, instead of deciding whether the retransmission data is required to be sent based on the side feedback information. When the side transmission resource is scheduled by the network equipment, i.e., the first mode mentioned above, the sender terminal is required to report the side feedback information to the network device, and the network device decides whether to allocate the retransmission resource to the terminal based on the ACK or NACK reported by the terminal.

In some embodiments of the present disclosure, the network device may configure the sender terminal with the CG resource for the SL transmission. That is, the network device is not required to dynamically schedule resources for the initial transmission or the retransmission of the data on the SL, such that no additional delay is introduced and the retransmission resource may be ensured to be acquired in time. In addition, the technical solutions of the present disclosure are also applicable to the case of the Uu interface also operating in the unlicensed spectrum. Further, as mentioned above, the CG resource period includes the plurality of CG resource sets, and the plurality of CG resource sets are configured for the initial transmission or the retransmission of the same data. Compared to a case with only one CG resource set, the case of including the plurality of CG resource sets may further improve a success possibility of the data transmission due to a larger number of the CG resources.

It should be understood that, for the sender terminal, after receiving the CG configuration information, the sender terminal is required to determine a time slot corresponding to each of a plurality of CG resources configured by the CG configuration information based on the CG configuration information. The sender terminal may determine the time slot of the first CG resource in each CG resource set configured by the CG configuration information, and determine time slots of other CG resources based on the time slot of the first CG resource, the SFN period, and the CG resource period. Manners of determining the time slot of the first CG resource in each CG resource set are described through the following several embodiments.

Embodiment 1

In response to the plurality of CG resources being the type 1 CG resources and the time slot involved in the CG configuration information being the SL time slot, the terminal device determines the time slot corresponding to the first CG resource of a first CG resource set based on the reference time slot, the offset time slot, an index corresponding to a first CG resource period, the CG resource period, an index of the first CG resource set in the first CG resource period, the time interval, the number of wireless frames of a SFN period, and the number of SL time slots of two wireless frames. The first CG resource period is any CG resource period after the RRC signaling is received. The RRC signaling is configured to carry the CG configuration information. The reference time slot is a time slot nearest to the RRC signaling before the RRC signaling is received. For example, the reference time slot configured by the network device is 0 and the RRC signaling is received in a time slot 1 of a current SFN period, the reference time slot herein refers to a time slot 0 of the current SFN period. For another example, the reference time slot configured by the network device is 5, and the RRC signaling is received in the time slot 0 of the current SFN period, the reference time slot herein refers to a time slot 5 of a previous SFN period of the current SFN period.

In some embodiments, the terminal device determines the time slot $S_{current}$ corresponding to the first CG resource of the first CG resource set by a formula (1).

$$S_{current}=(S_{start}+S_{offset}+S\times C+m\times K)\mod(\lfloor P_1/2 \rfloor \times L) \quad (1)$$

$S_{start}$ indicates the reference time slot, $S_{offset}$ indicates the offset time slot, S indicates the index corresponding to the first CG resource period, $S \geq 0$ and is incremented by 1 step, C indicates the CG resource period, m indicates the index of the first CG resource set in the first CG resource period, K indicates the time interval, $P_1$ indicates the number of the wireless frames of the SFN period, and L indicates the number of the SL time slots of two wireless frames.

It should be noted that an index corresponding to the first one of first CG resource periods after the RRC signaling is received may be 0, and the index corresponding to the first CG resource period after the first one is incremented according to a tolerance of 1. The index corresponding to the first one of the first CG resource periods after the RRC signaling is received may be, e.g., 1, instead of 0, and the index corresponding to the first CG resource period after the first one is incremented according to the tolerance of 1.

It should be understood that the parameter m=0, 1 . . . M−1, and M is the number of the CG resource sets in the CG resource period.

It should be understood that usually $P_1=1024$, such that the above formula (1) may be converted to the following formula (2).

$$S_{current}=(S_{start}+S_{offset}+S\times C+m\times K)\bmod(512L) \qquad (2)$$

In some embodiments, as shown in FIG. 5, in a case of the index corresponding to the first one of the first CG resource periods after the RRC signaling is received being 0, a time slot in which the first CG resource in the first CG resource set is $S_{current}=(S_{start}+S_{offset})\bmod(512\ L)$, and a time slot in which the first CG resource in the second CG resource set is $S_{current}=(S_{start}+S_{offset}+K)\bmod(512\ L)$.

Embodiment 2

In response to the plurality of CG resources being the type 2 CG resources and the time slot involved in the CG configuration information being the SL time slot, the terminal device determines a time slot corresponding to the first CG resource of a second CG resource set based on a first time slot, an index corresponding to a second CG resource period, the CG resource period, an index of the second CG resource set in the second CG resource period, the time interval, the number of wireless frames of a SFN period, and the number of SL time slots of two wireless frames. The first time slot is a time slot in which the first CG resource configured by the PDCCH signaling is, the second CG resource period is any CG resource period configured by the CG configuration information, and the second CG resource set is any CG resource set of the second CG resource period.

In some embodiments, the terminal device determines the time slot $S'_{current}$ corresponding to the first CG resource of the second CG resource set by a formula (3):

$$S'_{current}=(S'_{start}+S'\times C+m'\times K)\bmod(\lfloor P_1/2\rfloor\times L) \qquad (3);$$

$S'_{start}$ indicates the first time slot, $S'$ indicates the index corresponding to the second CG resource period, $S'\geq 0$ and is incremented by 1 step, C indicates the CG resource period, m indicates the index of the second CG resource set in the second CG resource period, K indicates the time interval, $P_1$ indicates the number of the wireless frames of the SFN period, and L indicates the number of the SL time slots of two wireless frames.

It should be noted that an index corresponding to the first one of second CG resource periods after the PDCCH signaling is received is certainly 0, and the index corresponding to the second CG resource period thereafter (i.e., after the first one) is incremented according to the tolerance of 1.

It should be understood that the parameter m'=1, 2 . . . M, and M is the number of the CG resource sets in the CG resource period.

It should be understood that usually $P_1=1024$, such that the above formula (3) may be converted to the following formula (4).

$$S'_{current}=(S'_{start}+S'\times C+m'\times K)\bmod(512L) \qquad (4)$$

In some embodiments, as shown in FIG. 5, the time slot in which the first CG resource in the first CG resource set is $S'_{current}=(S'_{start})\bmod(512\ L)$, and the time slot in which the first CG resource in the second CG resource set is $S'_{current}=(S'_{start}+K)\bmod(512\ L)$.

Embodiment 3

In response to the plurality of CG resources being the type 1 CG resources and the time slot involved in the CG configuration information being the resource-pool time slot, the terminal device determines the time slot corresponding to the first CG resource of the first CG resource set based on the reference time slot, the offset time slot, the index corresponding to the first CG resource period, the CG resource period, the index of the first CG resource set in the first CG resource period, the time interval, and the number of resource-pool time slots associated in a SFN period. The first CG resource period is any CG resource period after the RRC signaling is received. The RRC signaling is configured to carry the CG configuration information. The first CG resource set is any CG resource set of the first CG resource period, and the reference time slot is the time slot nearest to the RRC signaling before the RRC signaling is received. For example, the reference time slot configured by the network device is 0 and the RRC signaling is received in the time slot 1 of the current SFN period, the reference time slot herein refers to the time slot 0 of the current SFN period. For another example, the reference time slot configured by the network device is 5, and the RRC signaling is received in the time slot 0 of the current SFN period, the reference time slot herein refers to the time slot 5 of the previous SFN period of the current SFN period.

The terminal device determines the time slot $S_{current}$ corresponding to the first CG resource of the first CG resource set by a formula (5).

$$S_{current}=(S_{start}+S_{offset}+S\times C+m\times K)\bmod L \qquad (5);$$

$S_{start}$ indicates the reference time slot, $S_{offset}$ indicates the offset time slot, S indicates the index corresponding to the first CG resource period, $S\geq 0$ and is incremented by 1 step, C indicates the CG resource period, m indicates the index of the first CG resource set in the first CG resource period, K indicates the time interval, and L indicates the number of the resource-pool time slots associated in the SFN period.

It should be noted that the index corresponding to the first one of the first CG resource periods after the RRC signaling is received may be 0, and the index corresponding to the first CG resource period after the first one is incremented according to the tolerance of 1. The index corresponding to the first one of the first CG resource periods after the RRC signaling is received may be, e.g., 1, instead of 0, and the index corresponding to the first CG resource period after the first one is incremented according to the tolerance of 1.

It should be understood that the parameter m=0, 1 . . . M−1, and M is the number of the CG resource sets in the CG resource period.

Embodiment 4

In response to the plurality of CG resources being the type 2 CG resources and the time slot involved in the CG configuration information being the resource-pool time slot, the terminal device determines the time slot corresponding to the first CG resource of the second CG resource set based on the first time slot, the index corresponding to a second CG resource period, the CG resource period, the index of the second CG resource set in the second CG resource period, the time interval, and the number of resource-pool time slots associated in a SFN period. The first time slot is the time slot in which the first CG resource configured by the PDCCH signaling is. The second CG resource period is any CG resource period configured by the CG configuration information. The second CG resource set is any CG resource set of the second CG resource period.

In some embodiments, the terminal device determines the time slot $S'_{current}$ corresponding to the first CG resource of the second CG resource set by a following formula (6).

$$S'_{current}=(S'_{start}+S'\times C+m'\times K)\bmod L' \qquad (6);$$

$S'_{start}$ indicates the first time slot, S' indicates the index corresponding to the second CG resource period, S'≥0 and is incremented by 1 step, C indicates the CG resource period, m' indicates the index of the second CG resource set in the second CG resource period, K indicates the time interval, and L' indicates the number of the resource-pool time slots associated in the SFN period.

It should be noted that the index corresponding to the first one of the second CG resource periods after the PDCCH signaling is received is certainly 0, and the index corresponding to the second CG resource period thereafter (i.e., after the first one) is incremented according to the tolerance of 1.

It should be understood that the parameter m=1, 2 . . . M, and M is the number of the CG resource sets in the CG resource period.

In conclusion, in the present disclosure, after receiving the CG configuration information, the sender terminal may accurately determine the time slot corresponding to each of the plurality of CG resources based on the CG configuration information, so as to perform the SL transmission on a corresponding time slot.

The method embodiments of the present disclosure are described in detail above in combination with FIG. 4. Apparatus embodiments of the present disclosure are described in detail below in combination with FIGS. 6 to 10. It should be understood that the apparatus embodiments and the method embodiments correspond to each other, and similar descriptions in the apparatus embodiments can be referred to the method embodiments.

Figure 6:
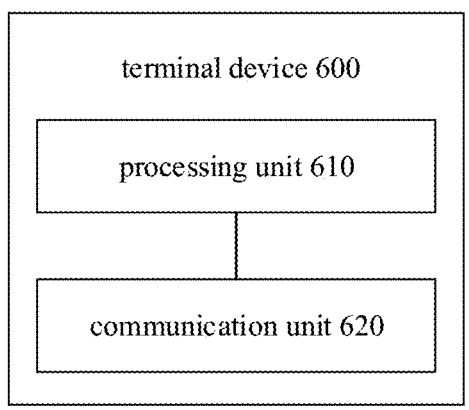
FIG. 6 is a structural schematic view of a terminal device 600 according to some embodiments of the present disclosure.

FIG. 6 is a structural schematic view of a terminal device 600 according to some embodiments of the present disclosure. As shown in FIG. 6, the terminal device 600 includes a processing unit 610 and a communication unit 620. The processing unit 610 is configured to acquire CG configuration information. The communication unit 620 is configured to perform a SL transmission based on the CG configuration information. The CG configuration information includes information of a plurality of CG resource sets in a CG resource period.

In some embodiments, the information of the plurality of CG resource sets includes at least one of: the number of the plurality of CG resource sets, and a time interval between any two CG resource sets of the plurality of CG resource sets which are adjacent to each other in time domain.

In some embodiments, the CG configuration information further includes at least one of: the CG resource period, a reference time slot, an offset time slot, and time-frequency configuration information of each CG resource in the CG resource sets. The offset time slot is an offset time slot of the first CG resource configured by the CG configuration information relative to the reference time slot.

In some embodiments, a time slot involved in the CG configuration information is a SL time slot or a resource-pool time slot. The SL time slot is a time slot configured for the SL transmission, and the resource-pool time slot is a time slot of a resource pool associated with the CG configuration information.

In some embodiments, wherein the SL time slot includes the resource-pool time slot.

In some embodiments, the reference time slot is 0 or $\lfloor P_1/2 \rfloor \times L \times (\frac{1}{2})$, in response to the time slot involved in the CG configuration information being the SL time slot. $P_1$ indicates the number of wireless frames of a System Frame Number (SFN) period, L indicates the number of SL time slots of two wireless frames, and $\lfloor \ \rfloor$ indicates rounding down.

In some embodiments, the reference time slot is 0 or $\lfloor P_2/2 \rfloor$, in response to the time slot involved in the CG configuration information being the resource-pool time slot. $P_2$ indicates the number of resource-pool time slots in a SFN period, and $\lfloor \ \rfloor$ indicates rounding down.

In some embodiments, the processing unit 610 is configured to determine a time slot corresponding to each of a plurality of CG resources based on the CG configuration information. The communication unit 620 is configured to perform the SL transmission on the time slot corresponding to each of the plurality of CG resources based on the CG configuration information.

In some embodiments, in response to the plurality of CG resources being type 1 CG resources and the time slot involved in the CG configuration information being the SL time slot, the processing unit 610 is configured to determine a time slot corresponding to the first CG resource of a first CG resource set based on the reference time slot, the offset time slot, an index corresponding to a first CG resource period, the CG resource period, an index of the first CG resource set in the first CG resource period, the time interval, the number of wireless frames of a SFN period, and the number of SL time slots of two wireless frames. The first CG resource period is any CG resource period after an RRC signaling is received, the RRC signaling is configured to carry the CG configuration information, the first CG resource set is any CG resource set of the first CG resource period, and the reference time slot is a time slot nearest to the RRC signaling before the RRC signaling is received.

In some embodiments, the processing unit 610 is configured to determine the time slot $S_{current}$ corresponding to the first CG resource of the first CG resource set by the following formula:

$S_{current} = (S_{start} + S_{offset} + S \times C + m \times K) \mod (\lfloor P_1/2 \rfloor \times L);$ $S_{start}$ indicates the reference time slot, $S_{offset}$ indicates the offset time slot, S indicates the index corresponding to the first CG resource period, S≥0 and is incremented by 1 step, C indicates the CG resource period, m indicates the index of the first CG resource set in the first CG resource period, K indicates the time interval, $P_1$ indicates the number of the wireless frames of the SFN period, L indicates the number of the SL time slots of two wireless frames; and $\lfloor \ \rfloor$ indicates rounding down.

In some embodiments, in response to the plurality of CG resources being type 2 CG resources and the time slot involved in the CG configuration information being the SL time slot, the processing unit 610 is configured to determine a time slot corresponding to the first CG resource of a second CG resource set based on a first time slot, an index corresponding to a second CG resource period, the CG resource period, an index of the second CG resource set in the second CG resource period, the time interval, the number of wireless frames of a SFN period, and the number of SL time slots of two wireless frames. The first time slot is a time slot in which the first CG resource configured by a Physical Downlink Control Channel (PDCCH) signaling is, the second CG resource period is any CG resource period configured by the CG configuration information, and the second CG resource set is any CG resource set of the second CG resource period.

In some embodiments, the processing unit 610 is configured to determine the time slot $S'_{current}$ corresponding to the first CG resource of the second CG resource set by the following formula:

$S'_{current} = (S'_{start} + S' \times C + m' \times K) \mod (\lfloor P_1/2 \rfloor \times L);$ $S'_{start}$ indicates the first time slot, S' indicates the index corresponding to the second CG resource period, S'≥0 and is incremented by 1 step, C indicates the CG resource period, m' indicates the index of the second CG resource set in the second CG resource period, K indicates the time interval, $P_1$ indicates the number of the wireless frames of the SFN period, L indicates the number of the SL time slots of two wireless frames; and ⌊ ⌋ indicates rounding down.

In some embodiments, in response to the plurality of CG resources being type 1 CG resources and the time slot involved in the CG configuration information being the resource-pool time slot, the processing unit 610 is configured to determine a time slot corresponding to the first CG resource of a first CG resource set based on the reference time slot, the offset time slot, an index corresponding to a first CG resource period, the CG resource period, an index of the first CG resource set in the first CG resource period, the time interval, and the number of resource-pool time slots associated in a SFN period. The first CG resource period is any CG resource period after an RRC signaling is received, the RRC signaling is configured to carry the CG configuration information, the first CG resource set is any CG resource set of the first CG resource period, and the reference time slot is a time slot nearest to the RRC signaling before the RRC signaling is received.

In some embodiments, the processing unit 610 is configured to t determine the time slot $S_{current}$ corresponding to the first CG resource of the first CG resource set by the following formula:

$$S_{current} = (S_{start} + S_{offset} + S \times C + m \times K) \bmod L';$$

$S_{start}$ indicates the reference time slot, $S_{offset}$ indicates the offset time slot, S indicates the index corresponding to the first CG resource period, S≥0 and is incremented by 1 step, C indicates the CG resource period, m indicates the index of the first CG resource set in the first CG resource period, K indicates the time interval, and L indicates the number of the resource-pool time slots associated in the SFN period.

In some embodiments, in response to the plurality of CG resources being type 2 CG resources and the time slot involved in the CG configuration information being the resource-pool time slot, the processing unit 610 is configured to determine a time slot corresponding to the first CG resource of a second CG resource set based on a first time slot, an index corresponding to a second CG resource period, the CG resource period, an index of the second CG resource set in the second CG resource period, the time interval, and the number of resource-pool time slots associated in a SFN period. The first time slot is a time slot in which the first CG resource configured by a PDCCH signaling is, the second CG resource period is any CG resource period configured by the CG configuration information, and the second CG resource set is any CG resource set of the second CG resource period.

In some embodiments, the processing unit 610 is configured to determine the time slot $S'_{current}$ corresponding to the first CG resource of the second CG resource set by the following formula:

$$S'_{current} = (S'_{start} + S' \times C + m' \times K) \bmod L';$$

$S'_{start}$ indicates the first time slot, S' indicates the index corresponding to the second CG resource period, S'≥0 and is incremented by 1 step, C indicates the CG resource period, m' indicates the index of the second CG resource set in the second CG resource period, K indicates the time interval, and L indicates the number of the resource-pool time slots associated in the SFN period.

In some embodiments, all CG resources in the CG resource period are configured to transmit the same data block.

In some embodiments, the communication unit described above may be a communication interface or a transceiver, or an input-output interface of a communication chip or a system-on-a-chip. The processing unit described above may be one or more processors.

It should be understood that the terminal device 600 in some embodiments of the present disclosure may correspond to the sender terminal in the method embodiments described above. The above and other operations and/or functions of each unit of the terminal device 600 are respectively intended to implement corresponding processes of the method embodiments and will not be repeated herein for brevity.

Figure 7:
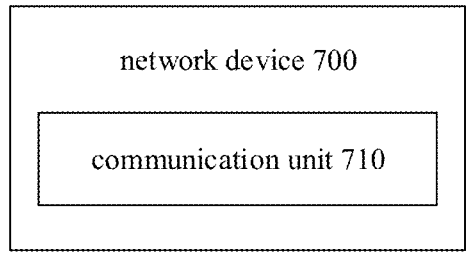
FIG. 7 is a structural schematic view of a network device 700 according to some embodiments of the present disclosure.

FIG. 7 is a structural schematic view of a network device 700 according to some embodiments of the present disclosure. As shown in FIG. 7, the network device 700 includes a communication unit 710. The communication unit 710 is configured to send CG configuration information to a terminal device. The CG configuration information includes information of a plurality of CG resource sets in a CG resource period.

In some embodiments, the information of the plurality of CG resource sets includes at least one of: the number of the plurality of CG resource sets, and a time interval between any two CG resource sets of the plurality of CG resource sets which are adjacent to each other in time domain.

In some embodiments, the CG configuration information further includes at least one of: the CG resource period, a reference time slot, an offset time slot, and time-frequency configuration information of each CG resource in the CG resource sets. The offset time slot is an offset time slot of the first CG resource configured by the CG configuration information relative to the reference time slot.

In some embodiments, a time slot involved in the CG configuration information is a SL time slot or a resource-pool time slot. The SL time slot is a time slot configured for the SL transmission, and the resource-pool time slot is a time slot of a resource pool associated with the CG configuration information.

In some embodiments, the SL time slot comprises the resource-pool time slot.

In some embodiments, the reference time slot is 0 or $\lfloor P_1/2 \rfloor \times L \times (\frac{1}{2})$, in response to the time slot involved in the CG configuration information being the SL time slot. $P_1$ indicates the number of wireless frames of a SFN period, L indicates the number of SL time slots of two wireless frames, and ⌊ ⌋ indicates rounding down.

In some embodiments, the reference time slot is 0 or $\lfloor P_2/2 \rfloor$, in response to the time slot involved in the CG configuration information being the resource-pool time slot. $P_2$ indicates the number of resource-pool time slots in a SFN period, and ⌊ ⌋ indicates rounding down.

In some embodiments, all CG resources in the CG resource period are configured to transmit the same data block.

In some embodiments, the communication unit described above may be a communication interface or a transceiver, or an input-output interface of a communication chip or a system-on-a-chip. The processing unit described above may be one or more processors.

It should be understood that the network device 700 in some embodiments of the present disclosure may correspond to the network device in the method embodiments described above.

The above and other operations and/or functions of each unit of the network device 700 are respectively intended to implement corresponding processes of the method embodiments and will not be repeated herein for brevity.

Figure 8:
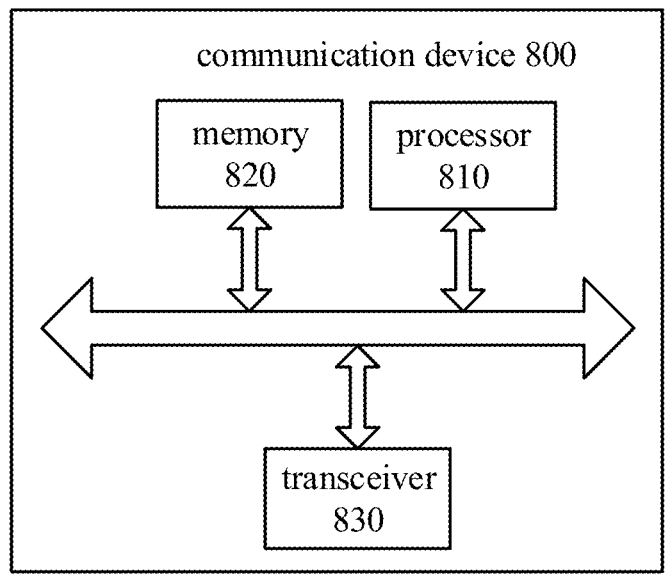
FIG. 8 is a structural schematic view of a communication device 800 according to some embodiments of the present disclosure.

FIG. 8 is a structural schematic view of a communication device 800 according to some embodiments of the present disclosure. The communication device 800 as shown in FIG. 8 includes a processor 810, and the processor 810 is configured to call a computer program from a memory and run the computer program to implement the method in some embodiments of the present disclosure.

In some embodiments, as shown in FIG. 8, the communication device 800 further includes the memory 820. The processor 810 is configured to call the computer program from the memory 820 and run the computer program to implement the method in some embodiments of the present disclosure.

The memory 820 may be separate device independent from the processor 810, or may be integrated in the processor 810.

In some embodiments, as shown in FIG. 8, the communication device 800 may also include a transceiver 830. The processor 810 may be configured to control the transceiver 830 to communicate with other devices. Specifically, the processor 810 may be configured to control the transceiver 1030 to send information or data to other devices, or receive information or data sent by the other devices.

In some embodiments, the transceiver 830 may include a transmitter and a receiver. The transceiver 830 may further include antennas, and the number of the antennas may be one or more.

In some embodiments, the communication device 800 may be the network device in some embodiments of the present disclosure and may implement a corresponding process implemented by the network device in each method in the embodiments of the present disclosure, which is not repeated herein for concision.

In some embodiments, the communication device 800 may be the terminal device in some embodiments of the present disclosure and may implement a corresponding process implemented by the terminal device in each method of the embodiments of the present disclosure, which is not repeated herein for concision.

Figure 9:
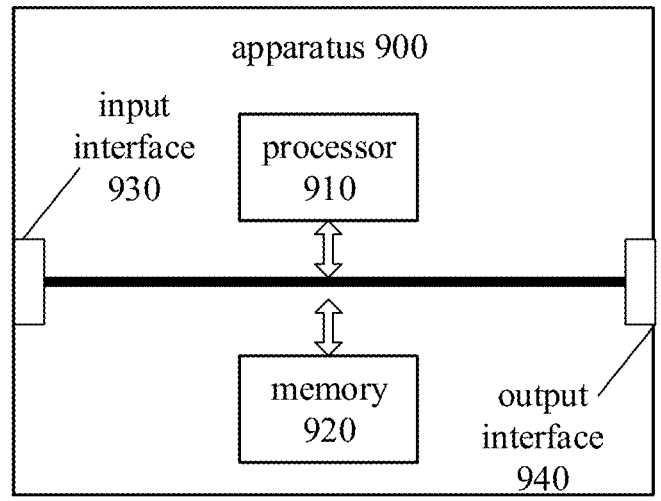
FIG. 9 is a structural schematic view of an apparatus according to some embodiments of the present disclosure.

FIG. 9 is a structural schematic view of an apparatus according to some embodiments of the present disclosure. The apparatus 900 shown in FIG. 9 includes a processor 910, and the processor 910 is configured to call a computer program from a memory and run the computer program to implement the method in some embodiments of the present disclosure.

In some embodiments, as shown in FIG. 9, the apparatus 900 further includes the memory 920. The processor 910 is configured to call the computer program from the memory 920 and run the computer program to implement the method in some embodiments of the present disclosure.

The memory 920 may be separate device independent from the processor 910, or may be integrated in the processor 910.

In some embodiments, the apparatus 900 may further include an input interface 930. The processor 910 may control the input interface 930 to communicate with other devices or chips. Specifically, the processor 910 may control the input interface 930 to acquire information or data sent by other devices or chips.

In some embodiments, the apparatus 900 may further include an output interface 940.

The processor 910 may be configured to control the output interface 940 to communicate with the other devices or chips. Specifically, the processor 910 may be configured to control the output interface 940 to output information or data to the other devices or chips.

In some embodiments, the apparatus may be applied to the network device in the embodiments of the present disclosure, and implement the corresponding process implemented by the network device in each method of the embodiments of the present disclosure, which is not repeated herein for concision.

In some embodiments, the apparatus may be applied to the terminal device in the embodiments of the present disclosure, and implement the corresponding process implemented by the terminal device in each method of the embodiments of the present disclosure, which is not repeated herein for concision.

It should be understood that the apparatus described in the embodiments of the present disclosure may be a chip, such as a system-on-chip, a system chip, a chip system, or system-on-chip, or the like.

Figure 10:
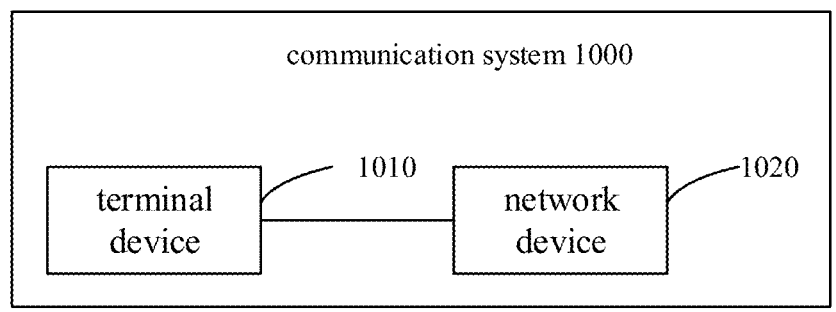
FIG. 10 is a structural schematic view of a communication system 1000 according to some embodiments of the present disclosure.

FIG. 10 is a structural schematic view of a communication system 1000 according to some embodiments of the present disclosure. As shown in FIG. 10, the communication system 1000 includes a terminal device 1010 and a network device 1020.

The terminal device 1010 is configured to implement corresponding functions achieved by the terminal device in the above method, and the network device 1020 is configured to implement corresponding functions achieved by the network device or a base station in the above method, which will not be repeated herein for concision.

It should be understood that the processor of the above embodiments of the present disclosure may be an integrated circuit chip having a signal-processing capability. In an implementation process, each operation of the above method embodiments may be implemented by an integrated logic circuit of a hardware in the processor or by instructions in a form of a software. The processor described above may be a general-purpose processor, a digital signal processor (DSP), an application specific integrated circuit (ASIC), a field programmable gate array (FPGA), or other programmable logic devices, a discrete gate or a transistor logic device, or a discrete hardware component. The processor may implement or execute each method, operation, and a logic block in the embodiments of the present disclosure. The general-purpose processor may be a microprocessor, and the processor may be any conventional processor, or the like.

The operations of the method described in combination with some embodiments of the present disclosure may be directly embodied to be executed by a hardware decoding processor, or be executed by a combination of the hardware and a software module in the decoding processor. The software module may be arranged in a storage medium well established in the art, such as a random memory, a flash memory, a read-only memory, a programmable read-only memory or an electrically rewritable programmable memory, a register, or the like. The storage medium is arranged in the memory, and the processor reads information in the memory and completes the operations of the above method in combination with the hardware.

It can be understood that the memory in some embodiments of the present disclosure may be either a volatile memory or a non-volatile memory, or may include both the volatile memory and the non-volatile memory. The non-volatile memory may be the read-only memory (ROM), the programmable read-only memory (PROM), an erasable programmable read-only memory (EPROM), an electrically EPROM (EEPROM), or a flash memory. The volatile memory may be a random access memory (RAM) and configured as an external cache. For example, but not as limitations, memories in many forms may be allowed, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM). It should be noted that the system and the method described in the description are intended to include but not limited to these and any other suitable types of memories.

It should be understood that above memories are exemplary but not limitative descriptions. For example, the memory in the embodiments of the present disclosure may be the SRAM, the DRAM, the SDRAM, the DDR SDRAM, the ESDRAM, the SLDRAM, and the DR RAM, and so on. That is, the memory in the embodiments of the present disclosure may be intended to include but not limited to these and any other suitable types of memories.

A computer-readable storage medium is provided in some embodiments of the present disclosure, and is configured to store a computer program.

In some embodiments, the computer-readable storage medium may be applied to the network device or the base station in some embodiments of the present disclosure. The computer program causes a computer to perform the corresponding processes implemented by the network device or the base station of each method in some embodiments of the present disclosure, which will not be repeated herein for brevity.

In some embodiments, the computer-readable storage medium may be applied to a mobile terminal/the terminal device in some embodiments of the present disclosure. The computer program causes the computer to perform the corresponding processes implemented by the mobile terminal/the terminal device of each method in some embodiments of the present disclosure, which will not be repeated herein for brevity.

A computer program product is provided in some embodiments of the present disclosure, and includes computer-program instructions.

In some embodiments, the computer program product may be applied to the network device or the base station in some embodiments of the present disclosure. The computer-program instructions cause the computer to perform the corresponding processes implemented by the network device or the base station of each method in some embodiments of the present disclosure, which will not be repeated herein for brevity.

In some embodiments, the computer program product may be applied to the mobile terminal/the terminal device in some embodiments of the present disclosure. The computer-program instructions cause the computer to perform the corresponding processes implemented by the mobile terminal/the terminal device of each method in some embodiments of the present disclosure, which will not be repeated herein for brevity.

A computer program is provided in some embodiments of the present disclosure.

In some embodiments, the computer program may be applied to the network device or the base station in some embodiments of the present disclosure. When the computer program is run on the computer, the computer program causes the computer to perform the corresponding processes implemented by the network device or the base station of each method in some embodiments of the present disclosure, which will not be repeated herein for brevity.

In some embodiments, the computer program may be applied to the mobile terminal/the terminal device in some embodiments of the present disclosure. When the computer program is run on the computer, the computer program causes the computer to perform the corresponding processes implemented by the mobile terminal/the terminal device of each method in some embodiments of the present disclosure, which will not be repeated herein for brevity.

A person of ordinary skill in the art can realize that units and algorithmic steps of each example described in conjunction with the embodiments in the description may be implemented by an electronic hardware, or a combination of a computer software and an electronic hardware. Whether these functions are implemented by means of the hardware or the software depends on a particular application and a design constraint of the technical solutions. The skilled person may adopt different methods for each particular application to implement described functions, and such implementation should not be construed to go beyond the scope of the present disclosure.

A person of ordinary skill in the art may learn clearly that specific operating processes of the system, the apparatus, and the unit described above may be referred to corresponding processes in the method embodiments above, which will not be repeated herein.

The system, the apparatus, and the method described in some embodiments of the present disclosure may be implemented in other ways. For example, the embodiments of the apparatus described above are merely schematic. For instance, a division for the units is only a logical functional division, and other division manners are allowed in actual implementation. For example, multiple units or components may be combined or integrated into another system, or some features may be ignored or not implemented. In addition, mutual coupling or direct coupling or a communication connection shown or discussed may be indirect coupling or communication connection of the apparatus or the units through some interface, which may be electrical, mechanical or other forms.

The unit illustrated as a separate component may be or may not be physically separated. Components shown as the units may be or may not be physical units. That is, the components may be located in one place or may be distributed to a plurality of network units. Some or all of these units can be selected according to practical needs to achieve the purpose of the solutions of some embodiments of the present disclosure.

In addition, each functional unit in each embodiment of the present disclosure may be integrated in a single processing unit, or each unit may physically exist alone, or two or more units may be integrated in a single unit.

When the functions are implemented in a form of a soft function unit and sold or used as a separate product, the functions may be stored in the computer-readable storage medium. Base on such concept, an essential part of the technical solutions of the present disclosure or a part of the technical solutions essentially contributes to the prior art, or a part of the technical solutions may be embodied in a form of a software product. The computer software product is stored in the storage medium and includes a number of instructions to cause a computer device (e.g., a personal computer, a server, or a network device, etc.) to perform all or some of the steps of the method described in various embodiments of the present disclosure. All or some of the steps of the method described in each embodiment of the present disclosure. The aforementioned storage media includes a U disk, a removable hard disk, the ROM, the RAM, a disk, or a CD-ROM, and other media capable of storing program codes.

The scope of the present disclosure is not limited to the above descriptions which are only specific embodiments of the present disclosure. Any change or substitution within a technical scope of the present disclosure easily obtained by a person skilled in the art who is familiar with the present technical field should be covered within the scope of the present disclosure. Therefore, the scope of the present disclosure shall be subject to a scope of the claims.

What is claimed is:

1. A terminal device, comprising:
   a processor; and
   a memory, configured to store a computer program;
   wherein the processor is configured to call and run the computer program stored in the memory to cause the terminal device to:
   acquire Configured Grant (CG) configuration information; and
   perform a sidelink (SL) transmission based on the CG configuration information;
   wherein the CG configuration information comprises information of a plurality of CG resource sets in a CG resource period;
   wherein the CG configuration information further comprises at least one of: the CG resource period, a reference time slot, an offset time slot, and time-frequency configuration information of each CG resource in the CG resource sets;
   wherein the offset time slot is an offset time slot of a first CG resource configured by the CG configuration information relative to the reference time slot;
   wherein a time slot involved in the CG configuration information is a SL time slot or a resource-pool time slot;
   wherein the SL time slot is a time slot configured for the SL transmission, and the resource-pool time slot is a time slot of a resource pool associated with the CG configuration information.

2. The terminal device according to claim 1, wherein the information of the plurality of CG resource sets comprises at least one of: a number of the plurality of CG resource sets, and a time interval between any two CG resource sets of the plurality of CG resource sets which are adjacent to each other in time domain.

3. The terminal device according to claim 1, wherein the SL time slot comprises the resource-pool time slot.

4. The terminal device according to claim 1, wherein the reference time slot is 0 or $\lfloor P_1/2 \rfloor \times L \times (½)$, in response to the time slot involved in the CG configuration information being the SL time slot;
   wherein $P_1$ indicates a number of wireless frames of a System Frame Number (SFN) period, L indicates a number of SL time slots of two wireless frames, and $\lfloor \ \rfloor$ indicates rounding down.

5. The terminal device according to claim 1, wherein the reference time slot is 0 or $\lfloor P_2/2 \rfloor$, in response to the time slot involved in the CG configuration information being the resource-pool time slot;

wherein $P_2$ indicates a number of resource-pool time slots in a SFN period, and $\lfloor \ \rfloor$ indicates rounding down.

6. The terminal device according to claim 1, wherein the processor is configured to call and run the computer program stored in the memory to cause the terminal device to:
   determine a time slot corresponding to each of a plurality of CG resources based on the CG configuration information; and
   perform the SL transmission on the time slot corresponding to each of the plurality of CG resources based on the CG configuration information.

7. The terminal device according to claim 6, wherein in response to the plurality of CG resources being type 1 CG resources and the time slot involved in the CG configuration information being the SL time slot, the processor is configured to call and run the computer program stored in the memory to cause the terminal device to:
   determine a time slot corresponding to the first CG resource of a first CG resource set based on the reference time slot, the offset time slot, an index corresponding to a first CG resource period, the CG resource period, an index of the first CG resource set in the first CG resource period, a time interval, a number of wireless frames of a SFN period, and a number of SL time slots of two wireless frames;
   wherein the first CG resource period is any CG resource period after an Radio Resource Control (RRC) signaling is received, the RRC signaling is configured to carry the CG configuration information, the first CG resource set is any CG resource set of the first CG resource period, and the reference time slot is a time slot nearest to the RRC signaling before the RRC signaling is received;
   wherein the terminal device determines the time slot $S_{current}$ corresponding to the first CG resource of the first CG resource set by the following formula:

$$S_{current} = (S_{start} + S_{offset} + S \times C + m \times K) \bmod (\lfloor P_1/2 \rfloor \times L);$$

wherein $S_{start}$ indicates the reference time slot, $S_{offset}$ indicates the offset time slot S indicates the index corresponding to the first CG resource period, $S \geq 0$ and is incremented by 1 step, C indicates the CG resource period, m indicates the index of the first CG resource set in the first CG resource period, K indicates the time interval, $P_1$ indicates the number of the wireless frames of the SFN period, L indicates the number of the SL time slots of two wireless frames; and $\lfloor \ \rfloor$ indicates rounding down.

8. The terminal device according to claim 6, wherein in response to the plurality of CG resources being type 2 CG resources and the time slot involved in the CG configuration information being the SL time slot, the processor is configured to call and run the computer program stored in the memory to cause the terminal device to:
   determine a time slot corresponding to the first CG resource of a second CG resource set based on a first time slot, an index corresponding to a second CG resource period, the CG resource period, an index of the second CG resource set in the second CG resource period, a time interval, a number of wireless frames of a SFN period, and a number of SL time slots of two wireless frames;
   wherein the first time slot is a time slot in which the first CG resource configured by a Physical Downlink Control Channel (PDCCH) signaling is, the second CG resource period is any CG resource period configured by the CG configuration information, and the second CG resource set is any CG resource set of the second CG resource period;

wherein the terminal device determines the time slot $S'_{current}$ corresponding to the first CG resource of the second CG resource set by the following formula:

$$S'_{current}=(S'_{start}+S'\times C+m'\times K)\bmod(\lfloor P_1/2\rfloor\times L);$$

wherein $S'_{start}$ indicates the first time slot, S' indicates the index corresponding to the second CG resource period, S'≥0 and is incremented by 1 step, C indicates the CG resource period, m' indicates the index of the second CG resource set in the second CG resource period, K indicates the time interval, $P_1$ indicates the number of the wireless frames of the SFN period, L indicates the number of the SL time slots of two wireless frames; and $\lfloor\ \rfloor$ indicates rounding down.

9. The terminal device according to claim 6, wherein in response to the plurality of CG resources being type 1 CG resources and the time slot involved in the CG configuration information being the resource-pool time slot, the processor is configured to call and run the computer program stored in the memory to cause the terminal device to:

determine a time slot corresponding to the first CG resource of a first CG resource set based on the reference time slot, the offset time slot, an index corresponding to a first CG resource period, the CG resource period, an index of the first CG resource set in the first CG resource period, a time interval, and a number of resource-pool time slots associated in a SFN period;

wherein the first CG resource period is any CG resource period after an RRC signaling is received, the RRC signaling is configured to carry the CG configuration information, the first CG resource set is any CG resource set of the first CG resource period, and the reference time slot is a time slot nearest to the RRC signaling before the RRC signaling is received;

wherein the terminal device determines the time slot $S_{current}$ corresponding to the first CG resource of the first CG resource set by the following formula:

$$S_{current}=(S_{start}S_{offset}+S\times C+m\times K)\bmod L';$$

wherein $S_{start}$ indicates the reference time slot, $S_{offset}$ indicates the offset time slot, S indicates the index corresponding to the first CG resource period, S≥0 and is incremented by 1 step, C indicates the CG resource period, m indicates the index of the first CG resource set in the first CG resource period, K indicates the time interval, and L' indicates the number of the resource-pool time slots associated in the SFN period.

10. The terminal device according to claim 6, wherein in response to the plurality of CG resources being type 2 CG resources and the time slot involved in the CG configuration information being the resource-pool time slot, the processor is configured to call and run the computer program stored in the memory to cause the terminal device to:

determine a time slot corresponding to the first CG resource of a second CG resource set based on a first time slot, an index corresponding to a second CG resource period, the CG resource period, an index of the second CG resource set in the second CG resource period, a time interval, and a number of resource-pool time slots associated in a SFN period;

wherein the first time slot is a time slot in which the first CG resource configured by a PDCCH signaling is, the second CG resource period is any CG resource period configured by the CG configuration information, and the second CG resource set is any CG resource set of the second CG resource period;

wherein the terminal device determines the time slot $S'_{current}$ corresponding to the first CG resource of the second CG resource set by the following formula:

$$S'_{current}=(S'_{start}+S'\times C+m'\times K)\bmod L';$$

wherein $S'_{start}$ indicates the first time slot, S' indicates the index corresponding to the second CG resource period, S'≥0 and is incremented by 1 step, C indicates the CG resource period, m' indicates the index of the second CG resource set in the second CG resource period, K indicates the time interval, and L' indicates the number of the resource-pool time slots associated in the SFN period.

11. A network device, comprising:
a processor; and
a memory, configured to store a computer program;
wherein the processor is configured to call and run the computer program stored in the memory to cause the network device to:
send CG configuration information to a terminal device;
wherein the CG configuration information comprises information of a plurality of CG resource sets in a CG resource period;
wherein the CG configuration information further comprises at least one of: the CG resource period, a reference time slot, an offset time slot, and time-frequency configuration information of each CG resource in the CG resource sets;
wherein the offset time slot is an offset time slot of a first CG resource configured by the CG configuration information relative to the reference time slot;
wherein a time slot involved in the CG configuration information is a SL time slot or a resource-pool time slot;
wherein the SL time slot is a time slot configured for the SL transmission, and the resource-pool time slot is a time slot of a resource pool associated with the CG configuration information.

12. The network device according to claim 11, wherein the information of the plurality of CG resource sets comprises at least one of: a number of the plurality of CG resource sets, and a time interval between any two CG resource sets of the plurality of CG resource sets which are adjacent to each other in time domain.

13. The network device according to claim 11, wherein the SL time slot comprises the resource-pool time slot.

14. The network device according to claim 11, wherein the reference time slot is 0 or $\lfloor P_1/2\times L\times(\frac{1}{2})$, in response to the time slot involved in the CG configuration information being the SL time slot;

wherein $P_1$ indicates a number of wireless frames of a SFN period, L indicates a number of SL time slots of two wireless frames, and $\lfloor\ \rfloor$ indicates rounding down.

15. The network device according to claim 11, wherein the reference time slot is 0 or $\lfloor P_2/2\rfloor$, in response to the time slot involved in the CG configuration information being the resource-pool time slot;

wherein $P_2$ indicates a number of resource-pool time slots in a SFN period, and $\lfloor\ \rfloor$ indicates rounding down.

16. A wireless communication method, applied to a terminal device, comprising:
acquiring CG configuration information; and
performing a SL transmission based on the CG configuration information;

wherein the CG configuration information comprises information of a plurality of CG resource sets in a CG resource period;

wherein the CG configuration information further comprises at least one of: the CG resource period, a reference time slot, an offset time slot, and time-frequency configuration information of each CG resource in the CG resource sets;

wherein the offset time slot is an offset time slot of a first CG resource configured by the CG configuration information relative to the reference time slot;

wherein a time slot involved in the CG configuration information is a SL time slot or a resource-pool time slot;

wherein the SL time slot is a time slot configured for the SL transmission, and the resource-pool time slot is a time slot of a resource pool associated with the CG configuration information.

17. The method according to claim 16, wherein the information of the plurality of CG resource sets comprises at least one of: a number of the plurality of CG resource sets, and a time interval between any two CG resource sets of the plurality of CG resource sets which are adjacent to each other in time domain.

18. The method according to claim 16, wherein the SL time slot comprises the resource-pool time slot.

19. The method according to claim 16, wherein the reference time slot is 0 or $\lfloor P_1/2 \rfloor \times L \times (\frac{1}{2})$, in response to the time slot involved in the CG configuration information being the SL time slot;

wherein $P_1$ indicates a number of wireless frames of a System Frame Number (SFN) period, L indicates a number of SL time slots of two wireless frames, and $\lfloor \ \rfloor$ indicates rounding down.

20. The method according to claim 16, wherein the reference time slot is 0 or $\lfloor P_2/2 \rfloor$, in response to the time slot involved in the CG configuration information being the resource-pool time slot;

wherein $P_2$ indicates a number of resource-pool time slots in a SFN period, and $\lfloor \ \rfloor$ indicates rounding down.

* * * * *